United States Patent
Fan et al.

(10) Patent No.: US 10,031,506 B2
(45) Date of Patent: Jul. 24, 2018

(54) MOTION CONTROL METHOD, MOTION CONTROL DEVICE, AND MOTION TRAJECTORY PLANNING METHOD

(71) Applicant: UBTECH Robotics Corp., Shenzhen (CN)

(72) Inventors: Wenhua Fan, Shenzhen (CN); Lifu Zhang, Shenzhen (CN); Xi Bai, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 19 days.

(21) Appl. No.: 15/409,490

(22) Filed: Jan. 18, 2017

(65) Prior Publication Data

US 2018/0164772 A1    Jun. 14, 2018

(30) Foreign Application Priority Data

Dec. 12, 2016    (CN) .......................... 2016 1 1141089

(51) Int. Cl.
  *G05B 19/18*    (2006.01)
  *G05B 19/19*    (2006.01)
  *G05B 19/416*    (2006.01)

(52) U.S. Cl.
  CPC ........... *G05B 19/19* (2013.01); *G05B 19/416* (2013.01); *G05B 2219/41223* (2013.01); *G05B 2219/43147* (2013.01)

(58) Field of Classification Search
  CPC .... G05B 19/408; G05B 19/416; G05B 19/19; G05B 2219/43194; G05B 19/231
  USPC .......................................................... 318/569
  See application file for complete search history.

(56) References Cited

U.S. PATENT DOCUMENTS

| | | | | |
|---|---|---|---|---|
| 5,770,829 | A * | 6/1998 | Katz | G05B 19/416 318/560 |
| 7,339,339 | B2 * | 3/2008 | Kanaoka | G05D 1/0208 318/568.12 |
| 2017/0282932 | A1 * | 10/2017 | Tian | B60W 50/0098 |

* cited by examiner

*Primary Examiner* — Shawki S Ismail
*Assistant Examiner* — Bradley Brown

(57) ABSTRACT

A motion control method includes: (a) obtaining a current position and a current velocity of a control object at a current time; (b) obtaining a current acceleration based on the current position and the current velocity, wherein the current acceleration has a positive correlation with a difference between the current position and a target position as well as a negative correlation with the current velocity; (c) controlling a motor for driving the control object utilizing the current acceleration; and (d) iteratively performing the steps (a)-(c) until the control object reaches the target position. A motion trajectory planning method and a motion control device are further provided. Through the above-mentioned way, the present disclosure could realize the smooth acceleration and smooth deceleration of the motor. As a result, smooth motion trajectory, less vibration, and stable motor with less overshoot could be achieved.

10 Claims, 5 Drawing Sheets

MOTION CONTROL METHOD, MOTION CONTROL DEVICE, AND MOTION TRAJECTORY PLANNING METHOD

CROSS REFERENCE TO RELATED APPLICATIONS

This application claims priority to Chinese Patent Application No. 201611141089.9, filed Dec. 12, 2016, which is hereby incorporated by reference herein in its entirety.

BACKGROUND

1. Technical Field

The present disclosure generally relates to motion control, and particularly to a motion control method, a motion control device, and a motion trajectory planning method.

2. Description of Related Art

In a motor servo system, position of a control object is usually used as a control target, and the difference between the current position and a target position is taken as an input quantity. Proportional integral derivative (PID) control method is adopted to realize the control of the duty cycle of voltage output pulse width modulation (PWM) signal. Due to the change of system parameters and the presence of external disturbances, the PID control method tends to make the system produce greater overshoot or even be unstable.

SUMMARY

The purpose of the present disclosure is providing a motion control method, a motion control device, and a motion trajectory planning method, which could solve the problem that the PID control is unstable in the prim art.

In order to solve the above-mentioned technical problem, a technical scheme adopted by the present disclosure is to provide a motion control method, which comprises: (a) obtaining a current position and a current velocity of a control object at the current time (b) obtaining a current acceleration based on the current position and the current velocity, wherein the current acceleration has a positive correlation with a difference between the current position and a target position as well as a negative correlation with the current velocity; (c) controlling a motor for driving the control object utilizing the current acceleration; and (d) iteratively performing the steps (a)-(c) until the control object reaches the target position.

Wherein, the step (b) comprises: obtaining the current acceleration through the formula $a(t)=K^2(s_0-s(t))-2Kv(t)$, wherein t is the current time, K is the accommodation coefficient, $s_0$ is the target position, s(t) is the position at the current time, v(t) is the velocity at the current time.

Wherein, the step (c) comprises: obtaining a next moment velocity utilizing the current acceleration, and the current velocity through the formula $v(t+1)=v(t)+h*a(t)$, wherein t+1 is the next moment, h is an iteration step length, that is, the time interval between the next moment and the current time; controlling the motor according to the next moment velocity.

Wherein, the step (a) comprises: acquiring the current position of the control object utilizing a position sensor, and obtaining the current velocity utilizing at least the current position and the position of a previous moment through differential calculus.

In order to solve the above-mentioned technical problem, another technical scheme adopted by the present disclosure is to provide a motion trajectory panning method, which comprises: (A) obtaining the current position and the current velocity at the current time; (B) obtaining the current acceleration based on the current position and the current velocity, wherein the current acceleration has a positive correlation with a difference between the current position and a target position as well as a negative correlation with the current velocity; (C) obtaining a next moment position utilizing the current position and the current velocity, and obtaining a next moment velocity utilizing the current acceleration and the current velocity, wherein the time interval between the next moment and the current time is an iteration step length; and (D) iteratively performing the steps (A)-(C) until reaching the target position, so as to obtain a motion trajectory.

Wherein, the step (B) comprises: obtaining the current acceleration through the formula $a(t)=K^2(s_0-s(t))-2Kv(t)$, wherein t is the current time, K is the accommodation coefficient, s(t) is the position at the current time, v(t) is the velocity at the current time.

Wherein, the step (C) comprises: obtaining the next moment position through the formula $s(t+1)=s(t)+h*v(t)$, where h is an iteration step length; and obtaining the next moment velocity through the formula $v(t+1)=v(t)+h*a(t)$.

Wherein, the motion trajectory includes a position trajectory and a velocity trajectory, wherein the velocity trajectory is continuous and without jump, and the velocity is zero at a starting position and the target position.

In order to solve the above-mentioned technical problem, the other technical scheme adopted by the present disclosure is to provide a motion control device, which comprises: a processor, a sensor, and a driver. The processor is coupled with the sensor and the driver, and is configured to execute a method comprising: (a) obtaining a current position and a current velocity of a control object at a current time through the sensor; (b) obtaining a current acceleration based on the current position and the current velocity, wherein the current acceleration has a positive correlation with a difference between the current position and a target position as well as a negative correlation with the current velocity; (c) controlling a motor for driving the control object utilizing the current acceleration through the driver; and (d) repeating steps (a)-(c) until the control object reaches the target position.

Wherein, the processor is configured to execute a method comprising: (a1) obtaining the current position and the current velocity of a control object at the current time through the sensor; (b1) obtaining the current acceleration based on the current position and the current velocity through the formula: $a(t)=K^2(s_0-s(t))-2Kv(t)$, wherein t is the current time, K is the accommodation coefficient, $s_0$ is the target position, s(t) is the position at the current time, v(t) is the velocity at the current time; (c1) obtaining a next moment velocity utilizing the current acceleration and the current velocity through the formula $v(t+1)=v(t)+h*a(t)$, wherein t+1 is the next moment, h is an iteration step length, that is, the time interval between the next moment and the current time; (d1) outputting the next moment velocity to the driver so as to control the motor of the control object; and (e1) iteratively performing the steps (a1)-(d1) until the control object reaches the target position.

The present disclosure has the advantages of utilizing the current position and the current velocity to obtain the current acceleration as well as utilizing the current acceleration to control a motor, which could realize the smooth acceleration and smooth deceleration of the motor. As a result, smooth motion trajectory, less vibration, and stable motor with less overshoot could be achieved.

Other objects, advantages and novel features of the invention will become more apparent from the following detailed description when taken in conjunction with the accompanying drawings.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
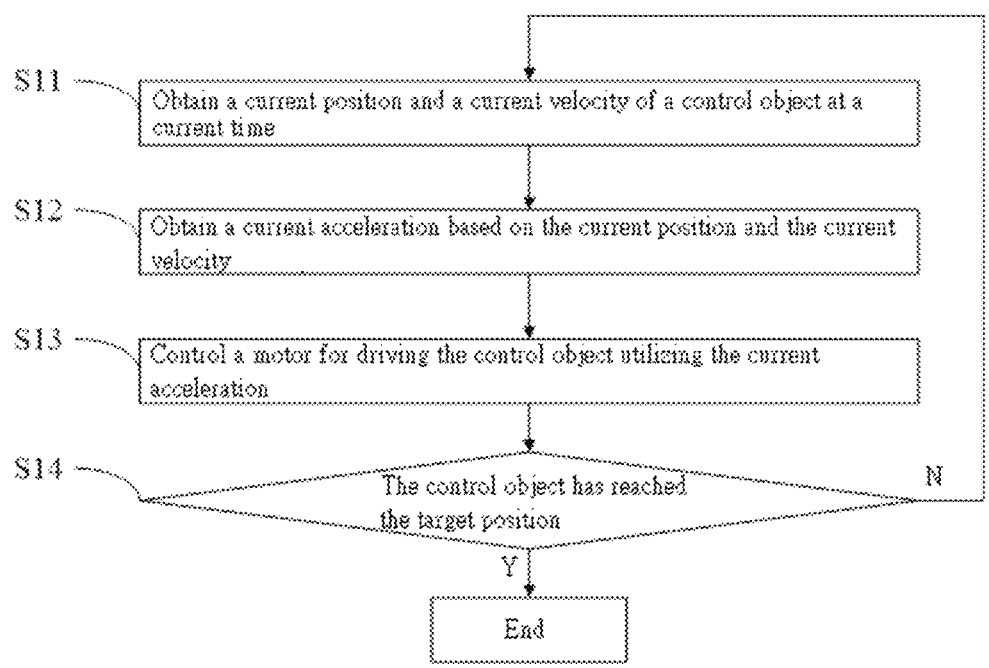
FIG. 1 is a flowchart of a motion control method according to a first embodiment of the present disclosure.

The present disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

As shown in FIG. 1, a first embodiment of a motion control method of the present disclosure comprises the following steps.

S11: obtaining a current position and a current velocity of a control object at a current time.

Generally, sensors are used to obtain the current position and the current velocity. Since the velocity is a differentiation of position with respect to time, and the acceleration is a differentiation of velocity with respect to time, at least one of a position sensor, a velocity sensor, and an acceleration sensor could be used to obtain the current position and the current velocity by combining the necessary differential and/or integral operations.

For instance, when the current position is obtained directly through only the position sensor, since the velocity is a differentiation of position with respect to time, if the iteration step length, that is, the time interval between two measurements is small enough, perform discretization on the velocity formula, and then the current velocity could be expressed as the difference between the current position and the previous moment position divided by an iteration step length. In addition, when the acceleration is obtained only using the acceleration sensor, the acceleration could be integrated to obtain the current velocity, the current velocity could be integrated to obtain the current position, and so on.

S12: obtaining a current acceleration based on the current position and the current velocity.

Wherein the current acceleration has a positive correlation with a difference between the current position and a target position, and has a negative correlation with the current velocity, so that the movement velocity of the control object is continuous and without jump, which gradually accelerated in the early stage of the whole movement process and gradually decelerated in the late stage, thereby meeting normal movement behaviors. The difference between the current position and the target position could be a straight-line distance between the two positions, or be a length of the movement trajectory between the two positions.

In an embodiment of this closure, the current acceleration is expressed as:

$$a(t)=K^2(s_0-s(t))-2Kv(t) \qquad (1)$$

Wherein t is the current time, K is the accommodation coefficient, $s_0$ is the target position, s(t) is the position at the current time, v(t) is the velocity at the current time, and the velocity is zero at a starting position and the target position. The value of K can be adjusted to change the magnitude of the acceleration, thereby changing the magnitude of acceleration and deceleration so as to change the movement time.

S13: controlling a motor for driving the control object utilizing the current acceleration.

The motor can be controlled directly based on the current acceleration, that is, outputting the current acceleration to the driver of the motor.

In addition, the current acceleration and the current velocity could be utilized to obtain a next moment velocity:

$$v(t+1)+h*a(t) \qquad (2)$$

Wherein t+1 is the next moment, v(t) is the velocity at the current time, h is an iteration step length, that is, the time interval between the next moment and the current time, a(t) is the current acceleration. The next moment velocity is output to the driver of the motor, so as to control the motor. The driver of the motor could adjust the magnitude of the voltage, the frequency, or other parameters of the motor based on the input quantity, so as to adjust the rotation speed of the motor. Adjusting the magnitude of h could also change the intensity of the velocity variation. The greater of h is, the more intensive of velocity changes.

S14: determining whether the control object has reached the target position.

Generally, the current position is compared with the target position of the control object.

If the two positions are identical or the difference is smaller than a predetermined threshold, the control object is determined to have reached the target position, and the process ends; if not, the process goes to step S11 to repeat the above-mentioned steps.

Through the implementation of the above-mentioned embodiment, the current position and the current velocity are utilized to obtain the current acceleration, and the current acceleration is used to control the motor, which can realize the smooth acceleration and smooth deceleration of the motor. As a result, smooth motion trajectory, less vibration, and stable motor with less overshoot could be achieved.

Figure 2:
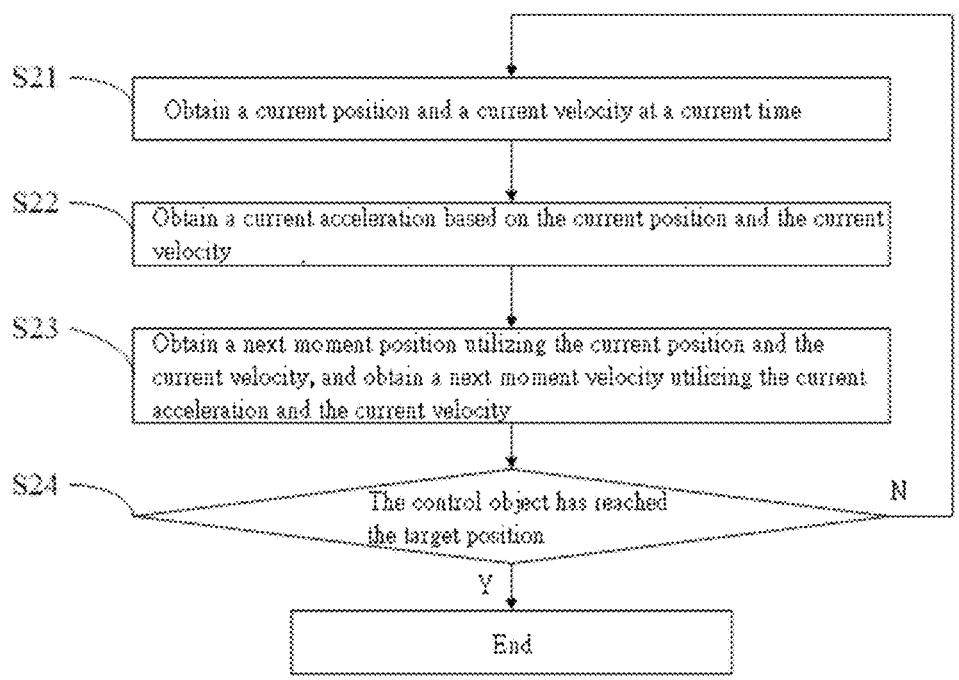
FIG. 2 is a flowchart of a motion trajectory planning method according to a first embodiment of the present disclosure.

As shown in FIG. 2, a first embodiment of a motion trajectory planning method of the present disclosure comprises:

S21: obtaining a current position and a current velocity at a current time.

S22: obtaining a current acceleration based on the current position and the current velocity.

The current acceleration has a positive correlation with a difference between the current position and a target position, and has a negative correlation with the current velocity, so that the movement velocity of the control object is continuous and without jump, which gradually accelerated in the early stage of the whole movement process and gradually decelerated in the late stage, thereby meeting normal movement behaviors. The difference between the current position and the target position could be a straight-line distance between the two positions, or a length of the movement trajectory between the two positions.

In this embodiment, the current acceleration is expressed as:

$$a(t)=K^2(s_0-s(t))-2Kv(t) \quad (1)$$

Wherein t is the current time, K is the accommodation coefficient, $s_0$ is the target position, s(t) is the position at the current time, v(t) is the velocity at the current time, and the velocity is zero at a starting position and the target position. The value of K can be adjusted to change the magnitude of the acceleration, thereby changing the magnitude of acceleration and deceleration so as to change the movement time. In other embodiments, the acceleration could be expressed using other formulas.

S13: obtaining a next moment position utilizing the current position and the current velocity, and obtaining a next moment velocity utilizing the current acceleration and the current velocity.

The velocity is a differentiation of position with respect to time, and the next moment position could be obtained through being substituted by the current position and the current velocity after performing discretization:

$$s(t+1)=s(t)+h^*v(t) \quad (3)$$

Wherein t+1 is the next moment, s(t) is the position at the current time, t is the current time, h is an iteration step length, that is, the time interval between the next moment and the current time, v(t) is the velocity at the current time.

The acceleration is a differentiation of velocity with respect to time, and the next moment velocity could be obtained through being substituted by the current velocity and the current acceleration after performing discretization:

$$v(t+1)=v(t)+h^*a(t)=v(t)+h^*(K^2(s_0-s(t))-2Kv(t)) \quad (4)$$

Wherein t+1 is the next moment, v(t) is the velocity at the current time, t is the current time, h is the iteration step length, that is, the time interval between the next moment and the current time, a(t) is the acceleration at the current time, K is the accommodation coefficient, $s_0$ is the target position, s(t) is the position at the current time.

The next moment velocity and the next moment position obtained in this step could be taken as the velocity and the position obtained in step S21 in the next cycle.

S24: determining whether the control object has reached the target position.

If the control object has reached the target position, the process ends; if not, the process goes to step S21 to repeat the above-mentioned steps. The motion trajectory includes a position trajectory and a velocity trajectory, wherein the velocity trajectory is continuous and without jump, and the velocity is zero at a starting position and the target position.

Figure 3:
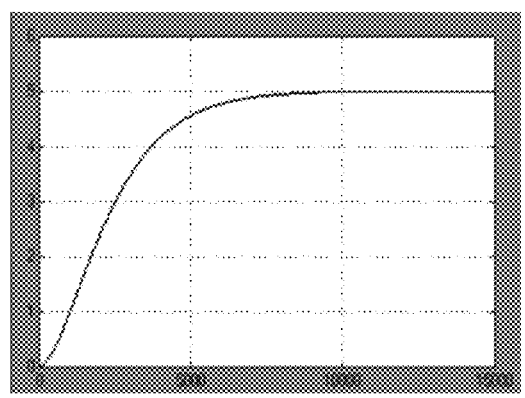
FIG. 3 is an emulated view of a position trajectory in an example of the motion trajectory planning method according to the first embodiment of the present disclosure.
Figure 4:
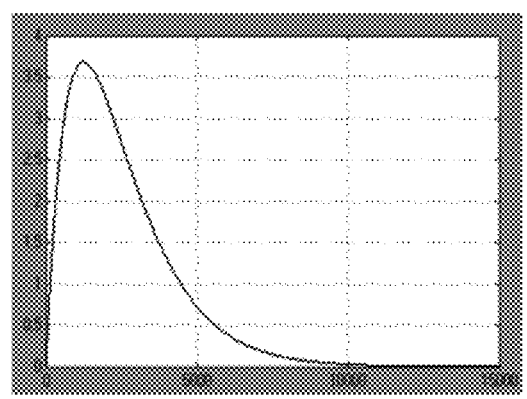
FIG. 4 is an emulated view of a velocity trajectory in an example of the motion trajectory planning method according to the first embodiment of the present disclosure.

For instance, assuming the initial position is 0, the target position is 5 meters, the initial velocity is 0, the iteration step length is 0.0004 seconds in a 2.5 kHz frequency control system, and the accommodation coefficient K is 2, the position trajectory obtained through emulation is shown in FIG. 3, and the velocity trajectory obtained through emulation is shown FIG. 4. It can be seen from the figures that the position trajectory and the velocity trajectory are relatively smooth, which has high efficiency and low energy consumption.

Figure 5:
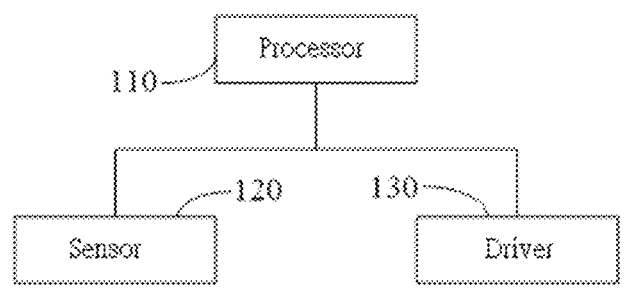
FIG. 5 is a schematic view of the structural of a motion control device according to a first embodiment of the present disclosure.

As shown in FIG. 5, a first embodiment of a motion control device of the present disclosure comprises a processor 110, a sensor 120, and a driver 130. The processor 110 is coupled with the sensor 120 and the driver 130, respectively.

The processor 110 is configured to control the operation of the motion control device, which could also be referred to as a central processing unit (CPU). The processor 110 could be an integrated circuit chip which has signal processing capability. The processor 110 could also be a general purpose processor, a digital signal processor (DSP), an application specific integrated circuit (ASIC), or a field-programmable gate array (FPGA), or other programmable logic devices, discrete gates or transistor logic devices, or discrete hardware components. The general purpose processor could be a microprocessor, while the processor 110 could also be any conventional processor or the like.

The sensor 120 is configured to detect the parameters of a motor of the control object and/or a motor for driving the control object.

The driver 130 is configured to control the motor, which could adjust the magnitude of the voltage, the frequency, or other parameters of the motor based on the input quantity, so as to adjust the rotation speed of the motor.

The motion control device could further comprise a memory (not shown) for storing instructions and data which are necessary for the operation of the processor 110.

In other embodiments, the processor 110 and the driver 130 could be integrated with each other.

The processor 110 is configured to execute a method comprising (the steps in the method could be implemented based on the instructions and the data stored in the memory); (a) obtaining a current position and a current velocity of a control object at a current time through the sensor 120; (b) obtaining a current acceleration based on the current position and the current velocity, wherein the current acceleration has a positive correlation with a difference between the current position and a target position as well as a negative correlation with the current velocity; (c) controlling a motor for driving the control object utilizing the current acceleration through the driver 130; and (d) iteratively performing the steps (a)-(c) until the control object reaches the target position.

Optionally, the processor 110 could also be configured to execute a method comprising (the steps in the method could be implemented based on the instructions and the data stored in the memory): (a1) obtaining the current position and the current velocity of a control object at the current time through the sensor; (b1) obtaining the current acceleration based on the current position and the current velocity through the formula: $a(t)=K^2(s_0-s(t))-2Kv(t)$, wherein t is the current time, K is the accommodation coefficient, $s_0$ is the target position, s(t) is the position at the current time, v(t) is the velocity at the current time; (c1) obtaining a next moment velocity utilizing the current acceleration and the current velocity through the formula $v(t+1)=v(t)+h^*a(t)$, wherein t+1 is the next moment, h is an iteration step length, that is, the time interval between the next moment and the current time; (d1) outputting the next moment velocity to the driver so as to control the motor of the control object; and (e1) iteratively performing the steps (a1)-(d1) until the control object reaches the target position. The accommodation coefficient K and the target position $s_0$ could be stored in the memory, or be obtained through an input module (not shown) such as a keyboard, a touch screen, a microphone, or the like, or obtained from other deices through a communication circuit.

The specific functions of the various parts of the embodiment of the motion control device of the present disclosure can be referred to in the corresponding description of the embodiment of the motion control method of the present disclosure, and will not be recited again.

In the embodiments provided by the present disclosure, it should be understood that the disclosed motion control device and method could be implemented in other ways. For instance, the above-mentioned embodiment of the motion control device are merely illustrative, wherein the partitioning of the modules or units is merely a partitioning based on logical function, and other partitioning schemes could be adopted in the actual implementation (i.e., multiple units or components could be combined or be integrated with another system, and some features could be omitted or not executed). In addition, the coupling being described such as the direct coupling or communication connection could be implemented through the indirect coupling or communication connection utilizing an interface, a device, or a unit, and could also be implemented in electrical, mechanical, or other forms.

The units described as separate components could or couldn't be physically separated, and the components described as units could or couldn't be physical units, that is, could be located in one place or be distributed over a plurality of network units. A portion or all of the units could be selected according to actual needs, so as to achieve the purpose of the embodiment of the present disclosure.

In addition, the functional units in the various embodiments of the present disclosure could be integrated in one processing unit, while each unit could physically present alone, or two or more units could be integrated in one unit. The above-mentioned integrated unit could be implemented in the form of hardware or software functional unit.

If the integrated unit is implemented in the form of a software functional unit, and is sold or used as a stand-alone product, it could be stored in a computer-readable storage medium. Based on the comprehension, the technical scheme of the present disclosure, whether the portion contributes to the prior art or the whole or a portion of the technical scheme could be implemented in the form of a software product. The software product could be stored in a storage medium, which could include a plurality of instructions for a computer device (which could be a personal computer, server, or network device, etc.) or a processor to execute all or a portion of the steps of the method described in the embodiment of the present disclosure. The storage medium includes a universal serial bus (USB) disk, a removable hard disk, a read-only memory (ROM), a random access memory (RAM), a magnetic disk, an optical disk, and the like which could store program code.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A motion control method, comprising:
    (a) obtaining a current position of a control object at a current time using sensors, and obtaining a current velocity of the control object;
    (b) obtaining a current acceleration based on the current position and the current velocity through the formula $a(t)=K^2(s_0-s(t))-2Kv(t)$, wherein t is the current time, K is the accommodation coefficient, $s_0$ is the target position, s(t) is the position at the current time, v(t) is the velocity at the current time;
    (c) responsive to controlling a motor for driving the control object utilizing the current acceleration; and
    (d) iteratively performing the steps (a)-(c) until the control object reaches the target position.

2. The method of claim 1, wherein the step (c) comprises:
    obtaining a next moment velocity utilizing the current acceleration and the current velocity through the formula $v(t+1)=v(t)+h*a(t)$, wherein t+1 is the next moment, h is an iteration step length; and
    responsive to controlling the motor according to the next moment velocity.

3. The method of claim 1, wherein
    the current velocity is obtained utilizing at least the current position and a position of a previous moment of the control object through differential calculus, and wherein the sensors include a position sensor.

4. The method of claim 2, wherein
    the current velocity is obtained utilizing at least the current position and a position of a previous moment of the control object through differential calculus, and wherein the sensors include a position sensor.

5. A motion trajectory planning method, comprising: (A) obtaining a current position of a control object at a current time using sensors, and obtaining a current velocity of the control object;
    (B) obtaining a current acceleration based on the current position and the current velocity through the formula $a(t)=K^2(S_0-s(t))-2Kv(t)$, wherein t is the current time, K is the accommodation coefficient, $S_0$, is the target position, s(t) is the position at the current time, v(t) is the velocity at the current time;
    (C) obtaining a next moment position utilizing the current position and the current velocity, and obtaining a next moment velocity utilizing the current acceleration and the current velocity, wherein the time interval between the next moment and the current time is an iteration step length; and
    (D) iteratively performing the steps (A)-(C) until reaching the target position, so as to obtain a motion trajectory.

6. The method of claim 5, wherein the step (C) comprises:
    obtaining the next moment position through the formula $s(t+1)=s(t)+h*v(t)$, wherein t+1 is the next moment, h is the iteration step length; and
    obtaining the next moment velocity through the formula $v(t+1)=v(t)+h*a(t)$.

7. The method of claim 5, wherein the motion trajectory includes a position trajectory and a velocity trajectory, wherein the velocity trajectory is continuous and without jump, and the velocity is zero at a starting position and the target position.

8. The method of claim 6, wherein the motion trajectory includes a position trajectory and a velocity trajectory, wherein the velocity trajectory is continuous and without jump, and the velocity is zero at a starting position and the target position.

9. A motion control device, comprising:
    a processor;
    a sensor; and
    a driver;
    wherein the processor is coupled with the sensor and the driver; the processor is configured to execute the following steps: (a) obtaining a current position of a control object at a current time using the sensor, and obtaining a current velocity of the control object; (b) obtaining a current acceleration based on the current position and the current velocity through the formula: $a(t)=K^2(s_0-s(t))-2Kv(t)$, wherein t is the current time, K is the accommodation coefficient, $s_0$ is a target position, s(t) is the position at the current time, v(t) is the velocity at the current time; (c) controlling a motor for driving the control object utilizing the current acceleration through the driver; and (d) iteratively performing the steps (a)-(c) until the control object reaches the target position.

10. The device of claim 9, wherein the step (c) comprises: (c1) obtaining a next moment velocity utilizing the current acceleration and the current velocity through the formula $v(t+1)=v(t)+h*a(t)$, wherein t+1 is the next moment, h is an iteration step length; and (c2) outputting the next moment velocity to the driver so as to control the motor of the control object.

* * * * *